United States Patent
Inuzuka

(10) Patent No.: US 8,215,672 B2
(45) Date of Patent: Jul. 10, 2012

(54) CONTROL DEVICE FOR TREAD CONTACT CONDITIONS OF VEHICLES

(76) Inventor: Masao Inuzuka, Sapporo (JP)

( * ) Notice: Subject to any disclaimer, the term of this patent is extended or adjusted under 35 U.S.C. 154(b) by 0 days.

(21) Appl. No.: 12/312,709

(22) PCT Filed: Nov. 5, 2007

(86) PCT No.: PCT/JP2007/071472
§ 371 (c)(1),
(2), (4) Date: May 22, 2009

(87) PCT Pub. No.: WO2009/060502
PCT Pub. Date: May 14, 2009

(65) Prior Publication Data
US 2011/0011688 A1    Jan. 20, 2011

(51) Int. Cl.
*B60B 39/00* (2006.01)
(52) U.S. Cl. .......................................... 280/757; 180/16
(58) Field of Classification Search ................... 280/757, 280/763.1, 855, 856; 188/4 R, 5; 301/42, 301/43; 180/15, 16
See application file for complete search history.

(56) References Cited

U.S. PATENT DOCUMENTS

| | | | | |
|---|---|---|---|---|
| 1,593,666 A * | 7/1926 | Mortenson | ...................... | 280/757 |
| 2,140,606 A * | 12/1938 | Stickles | ...................... | 188/4 B |
| 2,513,691 A * | 7/1950 | Tower | ...................... | 188/4 R |
| 2,767,809 A * | 10/1956 | Sutter | ...................... | 188/4 B |
| 2,790,514 A * | 4/1957 | Robinson | ...................... | 188/4 R |
| 2,809,704 A * | 10/1957 | Greely | ...................... | 180/15 |
| 3,415,537 A * | 12/1968 | Goggins | ...................... | 280/757 |
| 4,299,310 A | 11/1981 | Torneback | | |
| 5,010,982 A * | 4/1991 | Sedlmayr | ...................... | 188/4 B |
| 5,048,646 A * | 9/1991 | Carlsson | ...................... | 188/4 B |
| 5,100,175 A * | 3/1992 | Swallow et al. | ...................... | 280/757 |
| 5,236,067 A | 8/1993 | Inuzuka | | |
| 6,220,397 B1 * | 4/2001 | Beng | ...................... | 188/5 |
| 6,371,532 B1 * | 4/2002 | Skarie et al. | ...................... | 291/38 |
| 6,409,215 B1 | 6/2002 | Holmgren | | |

FOREIGN PATENT DOCUMENTS

| | | |
|---|---|---|
| DE | 28 20 016 | 11/1979 |
| FR | 784469 | 7/1935 |
| JP | 54-151202 | 11/1979 |
| JP | 59-154434 | 10/1984 |
| JP | 63-166808 | 10/1988 |
| JP | 64-4504 | 1/1989 |
| JP | 1-126801 | 8/1989 |

(Continued)

OTHER PUBLICATIONS

International Search Report dated Mar. 25, 2008 issued in PCT/JP2007/071472.

*Primary Examiner* — Joseph Rocca
(74) *Attorney, Agent, or Firm* — Edwards Wildman Palmer LLP

(57) ABSTRACT

This invention is a control device to vary the contact conditions of the tread of a vehicle to improve driving functions, such as skid prevention, noise reduction, road surface protection or road marking, by the choice of the appropriate trodden tips in given road conditions. The trodden tips and connected parts are unified to make a unit which is attached or detached with a simple connection such as the insertion at a convenient position, which enables the device to function properly with a lowered safety factor, reducing the size only to avoid damages of the device and around.

2 Claims, 4 Drawing Sheets

FOREIGN PATENT DOCUMENTS

| | | |
|---|---|---|
| JP | 2-86801 | 7/1990 |
| JP | 4-39910 | 4/1992 |
| JP | 4-189601 | 7/1992 |
| JP | 5-213021 | 8/1993 |
| JP | 8-332816 | 12/1996 |
| JP | 2008-114827 | 5/2008 |
| WO | WO-96/12624 | 5/1996 |
| WO | WO-99/38714 | 8/1999 |

\* cited by examiner

[Fig. 1]
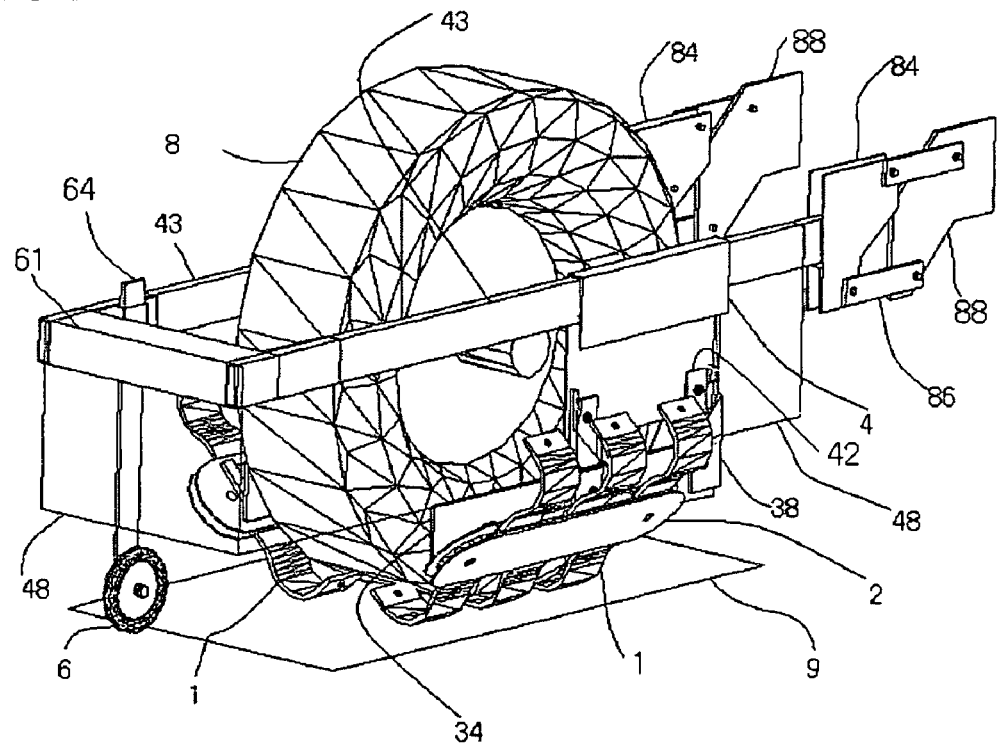
[Fig. 2]
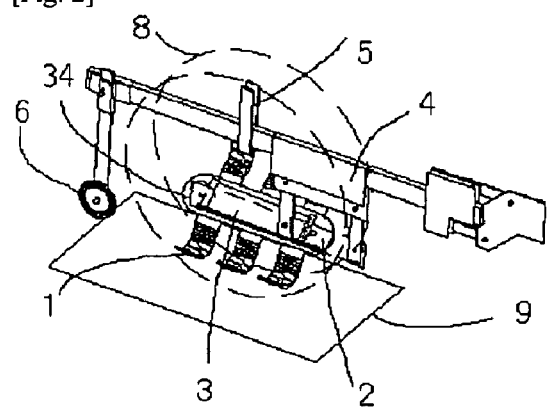
[Fig. 3]
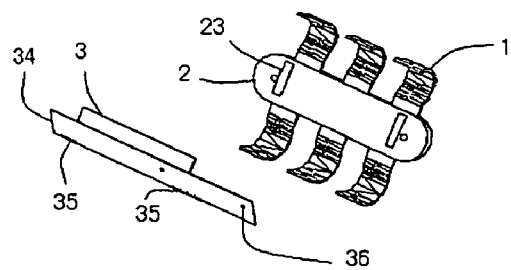

[Fig. 4]
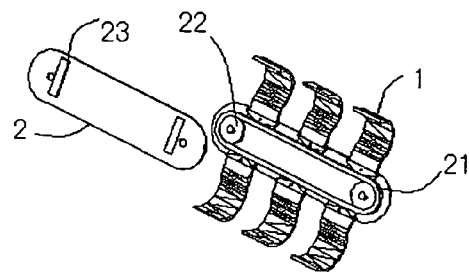
[Fig. 5]
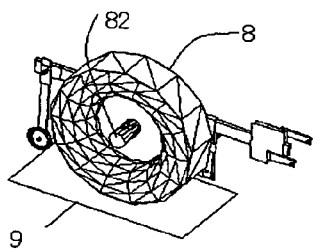
[Fig. 6]
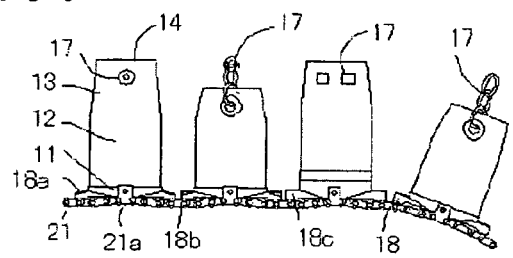
[Fig. 7]
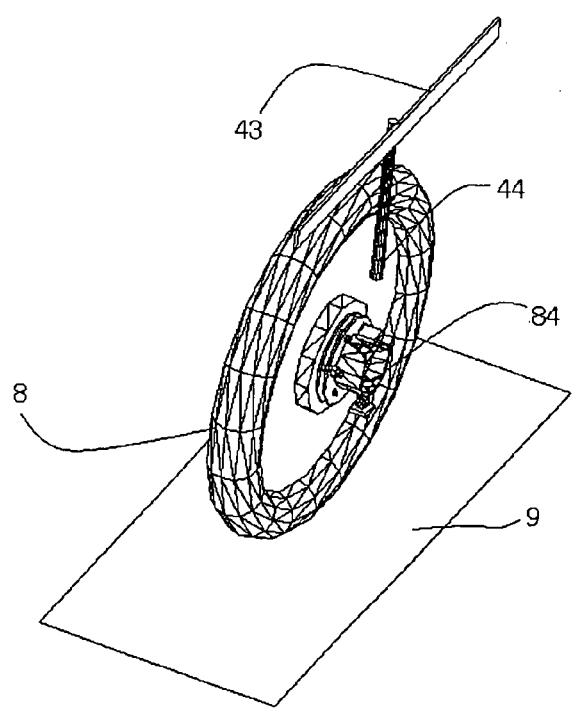

[Fig. 8]
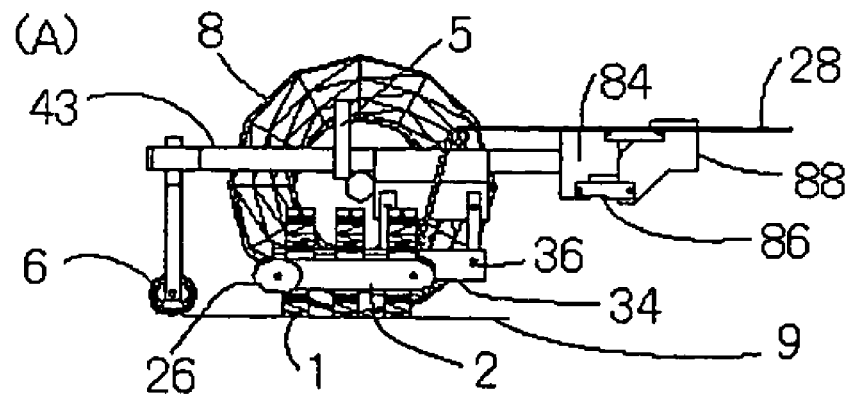
(A)
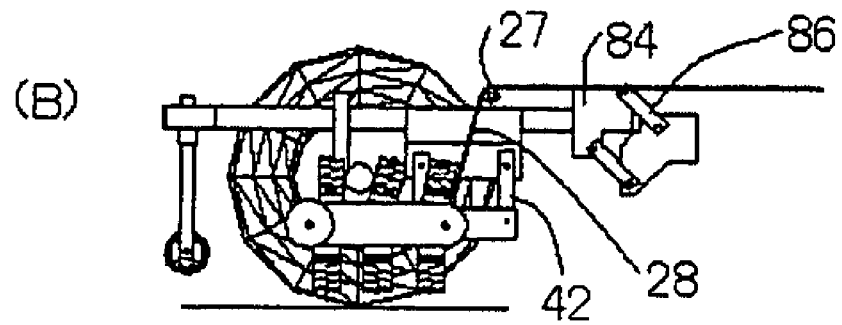
(B)
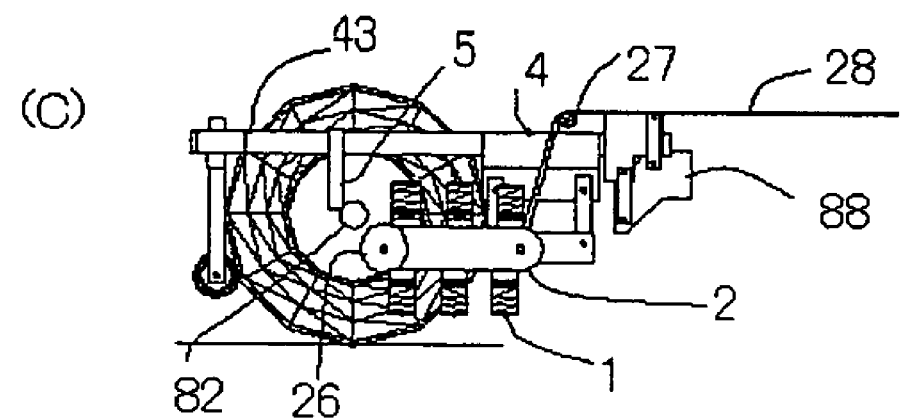
(C)

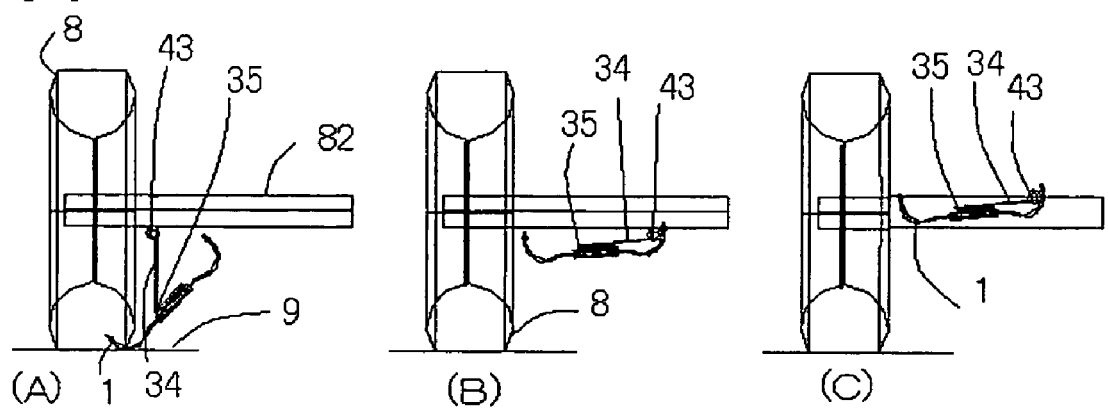

CONTROL DEVICE FOR TREAD CONTACT CONDITIONS OF VEHICLES

TECHNICAL FIELD

The present invention relates to a device for varying the contact conditions between a ground surface and a tread of a wheel of a wheeled vehicle by inserting track treading piece which is simple, light, small and durable, yet versatile, between the tread of the wheel and the ground surface.

BACKGROUND ART

Various inventions have improved the contact conditions of a vehicle tread since the invention of the wheel. In recent years, wheeled vehicles are being used more and more in winter so that demand has particularly increased for skid prevention on ice. Conventional means for improving such conditions may be divided broadly into two categories:

1) On the ground; this category consists of two types: One is a permanent type such as heating pavements with a drawback of high cost. Another is a temporary type such as a traction pad, or a so called "snow helper", which is a ragged thin board, commonly used for emergencies in cold regions of Japan. The drawback is not only their limited length but it is troublesome work to place these on the ground.

2) On vehicles; this category is a type to improve the wheel function on the road, by using treading pieces such as tire chains, studded tires or caterpillars. Although solving the above-mentioned drawbacks with endless motion of treading pieces, this category has drawbacks of damaging the road or the vehicle itself, since many drivers leave them on continuously even when they are unnecessary.

All the drawbacks of the above-mentioned systems can be solved by a removable type of track treading piece used only when necessary. Therefore many inventions have been proposed to realize this, using a device with circular motion of track treading pieces such as the patent document (1). The devices of these inventions, however, have the basic problem of the orbit discrepancy between a straight line of the tread and a cycloid of the track treading pieces. The discrepancy causes vibration, since the track treading pieces are pulled out continuously from underneath the tread. The friction coefficients are lowered and the track treading pieces and other related parts are subject to high stresses. In order to prevent damage, the devices are made stout and heavy. Therefore a limited number of special vehicles could use it. Besides, special techniques and facilities are required to make the installation so that the maintenance is costly and time consuming.

In order to solve problems of the orbit discrepancy, a treading device for wheels of the patent document (2) was devised. A smaller and lighter device was made by introducing a partly linear motion in the orbit of the treading pieces under the tread. The remote control or, on-off operation, from the driver's seat has been tested with a wire, a radio wave, electricity or radiation. The remote control is being developed to make it possible for the driver to control the position of the treading pieces from the driver's seat.

The treading device, however, has not been put to practical use because of the following drawbacks:

1) The large device is subject to serious damage, projecting from the vehicle body. All parts, even expendable fins trodden by the wheel, are fixed firmly at a complicated position behind the wheel. It is time-consuming and costly to repair the treading pieces even in well-equipped factories. The repair work, taking time and space, is not possible on the spot. Ruts in snow are deep and the minimum amount of snow is removed in cold regions. Therefore the device had to be overdesigned with the numerous safety factors just to avoid the repair work, which was similar to other conventional devices. The drawbacks are due to the excessive safety factor, raising the cost and restricting the use to very low speeds. The following interrelated drawbacks prevent practical use:

A) Special facilities are required for installation or removal.

B) Applicable vehicles are limited due to the size of the device,

C) Parts are costly since these are not mass-produced,

D) A powerful power source such as an air compressor is required.

E) Ice chips or stone can be sent flying making driving dangerous.

F) Driving is accompanied by vibrations and a deafening noise.

G) Driving is limited to a very slow speed.

2) Only limited kinds of materials, made of thick rubber sheet, are available for the treading pieces, since durability matters most. Besides, the retainer which holds the treading pieces is fixed behind the wheel. Accordingly it is not possible to choose the appropriate treading pieces in given road conditions in terms of the climate, the geography or uses.

3) Even the carefully designed device can be damaged when the tread falls into a dent such as a deep rut in the frozen road, since the device is subject to the whole weight of the vehicle. Accordingly the driving path has to be limited to avoid damage.

[Patent Citation 1]
U.S. Pat. No. 4,299,310 "Anti-skid device for motor vehicles 1981"

[Patent Citation 2]
U.S. Pat. No. 5,236,067 "Treading device for wheels 1993" (Japanese Patent 2545543 Treading device for wheels)

DISCLOSURE OF INVENTION

Technical Problem

The first problem to be solved is to be able to replace or repair expendable track treading pieces conveniently, or their trodden parts on spot to be precise. Although this is a main problem, trials have been gone in a wrong direction, with the conventional devices made with all the parts durable so that the trodden parts may be strong, but they are still not effective under some conditions. Then it was not expected to repair or replace while driving or at the driver's home. Therefore few track treading pieces are optimum in most conditions, since little choice is available. Difficult replacement makes it impossible to give drivers a choice of optimum track treads. In previous trials, the stronger the device was designed, the larger the size got in a vicious circle. The problem of replacement was not solved because it must be resolved to make a practical device with the following three points:

1) The shape and the size must make it possible to function in the limited space around the tread of a tire.

2) The device must be durable while driving in severe conditions.

3) The trodden parts of the track treading pieces must be appropriate for the vehicle in given conditions.

Technical Solution

The present invention comprises a mechanism to systematically replace inappropriate trodden parts of track treading pieces with more appropriate ones to fit driving conditions. The main feature of this invention is a combination between a simple connection and a control unit to enable, at an accessible position with light work, to attach or detach the control unit which includes at least the trodden parts. The connection is moved to an accessible position which has enough space for the work. Then safety factors of the device can be reduced, making the track treading pieces and the related parts smaller and lighter—i.e. the safety factor can be lowered, since any trouble can be avoided beforehand with warning, solved by replacing damaged parts instantly or using more suitable ones to match given conditions.

Thus, a solution for addressing the above comprises providing a control device for the tread conditions of the vehicle, in which the main part is a control unit. The control unit starts from a basic structure, unifying the track tread trodden part and other connected parts for attachment to a rotatable carrying mover. The unit can be enlarged to the carrying mover for ease of work, depending on the vehicle. Similarly the control unit is to be enlarged, including the retainer, holding the rotating body such as the pulley or the sprocket, round which the carrying mover is put in orbit. The carrying mover can be a belt-like member such as a roller chain. The control unit can be extended further to a buffering mechanism for the obstacle, on the road or the ground, up to an on-off mechanism to make the control device engaged or removed by lowering or lifting. The procedure can enlarge the control unit over the subunits or under units in the hierarchy to make it higher or larger. The highest control unit may include all parts of the device except the receiving part of the connection to the vehicle for attaching and detaching. Obviously the lower control units can have a workable space for easy moving, once the higher connection is detached or moved. The connections require no special facilities but simple portable tools, kept in the vehicle. The mechanism can be simple, such as an insertion which can be reinforced by a spring or a screw. Then, the present invention generally comprises four conditions:

1) treading pieces 1, having two objects, rotating themselves and controlling the tread contact conditions, and consisting of at least three parts, which are either fixed or attached with a detachable connection, out of the following four parts;

A) A connecting part 11, connecting a deformable part with a carrying mover 21, by friction, a pin, a cog or an elastic constrainer.

B) A deformable part 12, deforming by force and restituting after deforming

C) A contacting part 13, driving the carrying mover by contacting either a wheel tread 7 or said ground 9 or road directly.

D) A trodden part 14, controlling said contact condition by either holding a controlling tip 17 or deforming under said tread.

2) The control unit unifies the trodden part 14 and other connected parts, starting from the basic control unit of a treading piece 1 to a more complex structure, or more in particular from a connecting part 11 to the structure of the invention as a whole, except the receiving part of the connection to the vehicle body, and includes a detachable connection which is at the workable open space or movable to the open space, moving said control unit as a hierarchical unit as follows:

A) A primary control unit of the basic control units of treading pieces 1 plus the carrying mover 21 to which treading pieces 1 are connected.

B) A secondary control unit of the primary unit plus a retainer 2 by which the carrying mover is retained to rotate with the rotary part 22.

C) A third control unit of the secondary unit plus the retainer support 3 and other parts from the carriage 34 through the deflecting part 35, the buffering part 42 and the adjusting part 4 to the positioning part 43.

D) A fourth control unit of the third control unit plus said on-off mechanism.

3) A means to mitigate the damage due to deformation caused by centrifugal force on said treading piece, by combining different materials to control the body force of the weight distribution and the orbit of the circular motion of the trodden parts.

4) A means to control the trodden area, trodden by the tread 7, by changing the position of said track treading piece 1 with the mechanism A) or B) as follows;

A) A mechanism to tip the retainer 2 or the rotating plane of the treading piece 1, the mechanism being made of a hinge, a slide or a deformation of material.

B) A mechanism to change the position of the trodden part 14 by a twist, a spindle or a bend.

As shown in FIGS. 1-4 and 9, the control device can be improved by a tipping mechanism such as a hinge, with which the retainer 2 or the retainer support 3 is tipped to be put on the carriage 34 in order that the related parts—the carrying mover 21, the retainer 2, the retainer support 3, the carriage 34, the deflecting part 35 and the positioning part 35—are arranged in the shape of a flat body, as shown in FIG. 9 (B). All the related parts are combined with no projections made of hard materials such as steel which can be damaged. This flat shape increases the strength which is supported on the plane, either of a surface of the wheel revolution or of the vehicle bottom. In addition, the protective cover works better for the flat body.

For another use, each track treading piece 1 is attached to the carrying mover 21 of a belt-like member by a hinge (as shown in FIG. 6), adjusting the size and the shape of the shoulders 18 which can control the tension of the carrying mover 21 with three parts—protruding shoulder 18A, filling shoulder 15B and exchanging shoulder 18C—in order to make the rotation smooth, increase the device life, mitigate the shock due to the rotating inertia and spare a tensioner which is usually used for the belt-like member such as the roller chain.

For another use, a sliding apparatus 6 is used to improve the interchangeability. The weight of the present invention is partly supported by said sliding apparatus 6, moving with the vehicle along near the vehicle wheel with an independent wheel or a slide. The sliding apparatus 6 can keep the position, allowing the positioning mechanism to be simplified behind the wheel. Sparing a complicated positioning mechanism tailored for each vehicle, the sliding apparatus is enabled to be transferred to a different vehicle or makes exchanging much easier and faster. Therefore the device is produced economically, since one model is applicable for many vehicles.

For another use, two of said control units, the first and the second, are used for the wheel tread 7 on either a single side or both sides, broadening the applications as shown in A) or B).

A) A couple of said control units on both sides of said wheel 8, the first on the inner side and the second on the external, can improve the contact conditions far more than what conventional devices such as tire chains could achieve. Especially the couple, coupled by the tying part 61 shown in FIG. 1, is effective on soft substances like snow, preventing these to move away from the tread 7 under the treading pieces 1. Therefore the positioning parts 43, particularly behind the wheel, can be simplified and reduced. Also the size of the track treading pieces 1 can be smaller with the same effect so that they can move faster with less resistance of inertia. In addition, the couple can prevent the damage due to sending ice chips or stones flying. On top, the contact conditions, especially the contact pressure per an area, can be reduced by the couple. This effect can be enhanced by the concavo-convex surface or the magnetic attraction to attract each other of trodden parts 14, from both sides.

B) A pair of said control units on one side of said wheel 8 is of two different functions on different orbits. One being for the desired contact conditions by the trodden tips, another is for positioning these under the wheel tread 7. The former is of the track treading pieces 1 with special trodden parts 14 or control tips 17. The latter is of ones with particular contacting parts 13, rotating said carrying mover 21 by contacting directly either said wheel tread 7 or said ground 9.

For another use, the deflecting part 35, made of a hinge or a bending panel, is positioned in the inside space of the carrying mover 21 in order for the retainer 2 to be piled up on the carriage 34 at least momentarily. Then all these parts are in a shape of the flat board, much thinner than otherwise. The thinner, the stronger, particularly when a hanging curtain is set in front of the retainer 2 to be push up by the obstacle on the ground 9.

For another use, said control unit is covered with the cover 48 of the durable materials like flexible resins in order to prevent ice blocks or pebbles sent flying. Said cover protects objects near the wheel, but also said control unit from the obstacle on the ground 9. In addition the structure can serve a double purpose for said control unit and said cover to simplify the whole.

For another use as shown in FIG. 7, the linking part 84 and the installing equipment 88 are set to be rotatable but halted by the stabilizer 43 on a concentric circle so that these can be stable in the outside of the rotating wheels. This mechanism enables the easy application to the front wheels or steering wheels which have usually little space in between the wheels, particularly so in the front-drive vehicles. The operation of attaching and detaching is done by inserting a rod-like setting device 44. When said linking part 84 is a cylinder, two of the holes are used for said device 44 inserted into these two. Then the operation becomes simpler, sparing special gears.

For another use, the track treading pieces 1 while off are positioned within a narrow space in a thin plane, parallel to the orbit plane of the carrying mover 21 by either of the following two mechanisms. Thus the above mentioned problems are solved more effectively.

1) The connecting part 11 or the deforming part 12, curved or flexible, is partly of a spindle or a twistable material to angle the contacting part 13 or the trodden part 14 in a torsion angle with a rotation axis in the on-off operation. While on, the trodden parts are spread out to be in a trodden position. When off, treading pieces are in a narrow space by the torsion.

2) Two deforming parts 12, as a pair, are prepared in different endless orbits by the couple of carrying movers 21. The pair is linked to a trodden part 14 to be twisted by the distance between the deforming parts. Thus the distance between the carrying movers 11 gives the torsion angle for an area of the trodden part 14 trodden by the wheel tread 7 up to the on-off operation. This mechanism simplifies the operation and reduces the volume of the present invention further.

Advantageous Effects

The control unit, choosing the parts from the track treading piece 1 and others according to the use, enables it to reduce or remove troubles of maintenance work and to reduce the size, increasing the applicability of the device. On top the variety of the treading pieces provides benefits for driving in severe conditions. In addition, the smaller size of the device allows the adjustment of the position so that the mass production is applicable to overcome the uneconomical drawbacks of the conventional devices. The appropriate treading pieces being chosen at a driver's discretion, driving conditions of vehicles can be improved not only on the ice but on the other surfaces.

BRIEF DESCRIPTION OF DRAWINGS

FIG. 1 is a perspective view when the execution example 1 of the present invention is in use, in which two of the control units—the first on the internal side and the second on the external side, are applied to wheel 8. These control units are the fourth ones or the highest in the hierarchy, as previously discussed. (execution example 1).

FIG. 2 is a perspective view of the components of execution example 1, the wheel 8 being in dotted lines and the second device on the external side being removed. (execution example 1).

FIG. 3 is a perspective view showing the components of both the receiving mechanism of the retainer support 3 and the control unit of the first device of example 1 consisting of the parts from the trodden part 1 to the attaching part 23 on the retainer 2. (execution example 1).

FIG. 4 is a perspective view showing how to hold the carrying mover 21, a belt-like member, with the rotating parts 22 in the retainer 2. (execution example 1).

FIG. 5 is a perspective view showing only the first device, or the inner one, behind the wheel 8 rotating on the ground 9 with the axle 82. (execution example 1).

FIG. 6 is a perspective view showing the basic control unit of the trodden part 14 and the related, which are carried by the carrying mover 21 keeping the rotation smooth due to the shoulder 18. (execution example 1).

FIG. 7 is a perspective view showing the mechanism of the positioning part 43 connected with the setting part 44 and the linking part 84 to the wheel 8 in the vehicle front, (execution example 2).

FIG. 8 is an elevation view showing the motion of the device from the engaged position or the on-position (A) through (B) to the retracted position or the off-position (C) with the retainer 2 pulled by the wire of the on-off part 28. (execution example 3).

FIG. 9 is a sectional view showing the motion of the device from the engaged position or the on-position (A) through (B) to the retracted position or the off-position (C). (execution example 4).

EXPLANATION OF REFERENCE

1 Track Treading piece
2 Retainer
3 Retainer support
4 Adjusting part
5 Guiding part
6 Sliding apparatus
7 Wheel Tread
8 Wheel
9 Ground
10 Basic unit
11 Connecting part
12 Deforming part
13 Contacting part
14 Trodden part
17 Controlling tip
18 Shoulder 18A Protruding shoulder
18B Filling shoulder
18C Exchanging shoulder
21 Carrying mover
21A Gripping part
22 Rotating part (such as disk or sprocket)
23 Attaching part
26 Rotating guide
27 On-off ancillary
28 On-off part
34 Carriage
35 Deflecting part
36 Hinge pin
37 Buffering spring
42 Buffering part
43 positioning part
44 Setting part
48 Protecting cover
61 Tying part
64 Height apparatus
82 Axle
84 Linking part
86 Lifting equipment
88 Installing equipment

BEST MODE FOR CARRYING OUT THE INVENTION

Referring to FIG. 1, a couple of the control units are set on both sides of the wheel 8. Each of these forms a hierarchical structure, including parts from the trodden part 14 via the adjusting part 4 to the positioning part 43 and has the installing equipment 88 fixed to the steel frame of a vehicle (a truck). Said installing equipment 88 supports a lifting equipment 86 which consists of swing arm(s) to lift or lower a linking part 84, into which the end of the positioning part 43 is inserted and fixed with a detachable mechanism such as a latch or a cotter. This control unit holds a sub unit, starting from said adjusting part 4 which can adjust the position of the retainer 2 for a different vehicle. In addition the unit can slide toward the front in order to transfer the retainer 2 to the open space, where it is easy to replace the retainer 2 as well as trodden part 14. The buffering part 42, connected to the adjusting part 4, consists of two swing arms and supports, with rotatable means such as hinge pins 36, the carriage part 34 to which the retainer support 3 is connected with deflecting parts 35 of hinges. The retainer 2 can be pushed back by an obstacle on the ground 9, thanks to a deformation of said buffering part 42. The deformation is restored by the buffering spring 38 after the retainer 2 passes by the obstacle. The height of positioning parts 43, tied by the tying part 61, is adjusted for a vehicle by the height apparatus 64, supported by the escorting equipment 6. The protecting cover 48, made of transparent vinyl sheet, is to prevent the harmful sticking or damage due to freezing.

Two adjusting parts 43, adjusting the height of the adjusting part 4, are linked by the tying part 61 which is supported by the height apparatus 64 on the escorting equipment 6 running on the ground 9. FIG. 2 shows the perspective view to elucidate the mechanism of FIG. 1, where one device is removed on the external side of the wheel 8, which is drawn in dotted lines. The retainer 2 of a secondary control unit, leaving the treading pieces rotating freely, is connected to the retainer-support 3 by insertion. The guiding part 5, fixed to the axle 82, guides the positioning part 43 in a vertical motion. Thus the retainer 2 can lead the track treading pieces under the wheel 8 or the wheel tread 7 in order to function.

The retainer-support 3 is connected to the carriage 34 via the deflecting parts 35 to make the retainer 2 rotate to tip as shown in FIG. 3. The deflecting parts 35 elastically keep the retainer 2 oblique to lead the trodden parts 14 under the wheel tread 7 so that it can mitigate, by rotating toward vertical, damage due to obstacles on the ground. The retainer-support 3 being inserted into the gap between two attaching parts 23, the secondary control unit of the retainer 2 can be replaced easily.

FIG. 4 shows the mechanism in which the primary control unit of the carrying mover 21 and the basic control units of track treading pieces 1 is held by the retainer 2 with rotating parts 22 such as sprockets or pulleys.

FIG. 5 shows the main parts of the device are behind the wheel 8 which is able to get the necessary contact conditions by treading the trodden parts under the wheel tread.

FIG. 6 shows the various controlling tips 17 in basic units which are connected to the carrying mover 21 at the gripping parts 21A. The satisfactory function is possible by using rubber sheet for a treading piece and a roller chain for a carrying mover. The chain can be SK-1 of No. 35 in JIS.

Mode for the Invention 1

FIG. 1 is a perspective view of a practical example 1 of a control device which is replaceable with a detachable connection of the linking part 84 at the right end of the positioning part 43. A couple of the control units are set for both sides of a wheel 8 made of rubber. Each control unit consists of the positioning part 43 of a steel pipe, attached to the linking part 84 by insertion. The positioning part 43 is lifted or lowered by the lifting equipment 86 so that the position of the retainer 2 and treading pieces is controlled together with the guiding part 5.

Mode for the Invention 2

FIG. 7 is a perspective view of a practical example 2 of the present invention applied to the external side of a wheel. The control device has the positioning part 43 supported by a setting part 44 of a rod, held roughly vertical. The linking part 84 is rotatably fixed to the center of wheel 8, using a roller bearing. The setting part rod is inserted into the linking part 94 so that the positioning part 43 is kept stable, roughly horizontally.

Mode for the Invention 3

FIG. 8 shows a set of side views of a practical example 1 which has the retainer 2 controlled by a tension of the on-off part 28 of a steel chain, pulling up the retainer 2, for an off-condition, through the on-off ancillary 27 made of a pulley. When the control device is engaged or in on-condition, the retainer 2 is oblique and lowered to lead track treading pieces 1 on the ground 9, as shown in (A). Being pulled, the on-off part 28 lifts the retainer 2 and tips it upright so that the control device stops working, as shown in (B). The further being pulled, the further ahead the retainer and treading pieces move up to the resting position. Therefore the retainer 2 can avoid damages due to being pressed to the axle 82, as shown in (C). In addition, the rotating guide 26 is fixed to facilitate the motion.

(A) On-condition (by the lifting equipment 86 of horizontal swing arms and the deflecting part 35 is elastically open);

(B) On the way to the off-condition (the retainer 2 is lifted after getting upright);

(C) Off-condition in resting position (enough space above is prepared to the big obstacle on the ground).

Mode for the Invention 4

FIG. 9 shows the sectional views, when retracted, having the control device retracted horizontally on a vehicle such as a passenger car with a low floor.

(A) On-condition (A treading piece 1 is in place in front of the tire 8 to continue treading);

(B) On the way to the off-condition (the retainer 2 is lifted when horizontal);

(C) Off-condition in resting position (it is strong enough to be supported by the flat plane when it encounters a big obstacle).

INDUSTRIAL APPLICABILITY

The control device of the present invention improves, thanks to the appropriate contact conditions, the movement of various vehicles not only in skidding but in all other conditions in safety, efficiency and comfort.

The invention claimed is:

1. A control device for controlling a tread contact condition of a vehicle wheel, the control device comprising:
    a track treading piece insertable under and in contact with a tread of the vehicle wheel, the track treading piece being carried by a carrying mover of an endless member in a closed curve orbit;
    a controlling unit movable between a work position, wherein the track treading piece is disposable between the tread of the wheel and a ground surface, and a non-work position, the controlling unit including a linking part, a positioning part and the carrying mover, the linking part connecting the controlling unit to a vehicle and the positioning part being detachably connected to the linking part;
    an adjuster controlling an area of the track treading piece contacted by the tread of the wheel, the adjuster comprising at least one of:
        an angle adjustment assembly that adjusts an angle of a retainer housing the carrying mover, or a rotating plane of the track treading piece, the angle adjustment assembly comprising at least one of a hinge, a slide, or a material selected for its deformation properties; and,
        a rotational adjuster for rotating a portion of the track treading piece relative to the carrying mover;
    wherein
    the track treading piece comprises:
        a connecting part connecting a deformable part of the track treading piece to the carrying mover,
        the deformable part being elastically deformable by a force and restituting after deformation;
        a contacting part rotating the carrying mover as a result of contact with the tread of a wheel or a ground surface, and
        a trodden part controlling the tread contact condition by applying a force upon a controlling tip of the track treading piece.

2. The control device according to claim 1, wherein the angle adjuster is operable so as to dispose the carrying mover in a storage position such that a plane of rotation of the carrier mover is disposed substantially parallel or perpendicular with the axis of rotation of the vehicle wheel, and at positions therebetween such that the control device and components thereof do not contact the vehicle wheel or the ground surface.

* * * * *